(12) United States Patent
Nord

(10) Patent No.: US 7,535,722 B2
(45) Date of Patent: May 19, 2009

(54) MECHANICAL ROTATION AND ELECTRICAL INTERFACE COMBINATION

(75) Inventor: Lars Nord, Lund (SE)

(73) Assignee: Sony Ericsson Communications AB, Lund (SE)

( * ) Notice: Subject to any disclaimer, the term of this patent is extended or adjusted under 35 U.S.C. 154(b) by 305 days.

(21) Appl. No.: 11/477,582

(22) Filed: Jun. 29, 2006

(65) Prior Publication Data
US 2007/0002543 A1    Jan. 4, 2007

Related U.S. Application Data

(60) Provisional application No. 60/696,888, filed on Jul. 6, 2005.

(30) Foreign Application Priority Data
Jul. 4, 2005    (EP)    .................. 05014486

(51) Int. Cl.
*H05K 5/00*    (2006.01)
(52) U.S. Cl. .................. 361/755; 361/679; 361/680; 361/681; 361/814; 174/254
(58) Field of Classification Search .......... 361/755, 361/679–681, 814; 174/254
See application file for complete search history.

(56) References Cited

U.S. PATENT DOCUMENTS

| | | | |
|---|---|---|---|
| 4,272,758 A | | 6/1981 | Giraud et al. |
| 4,788,527 A | | 11/1988 | Johansson et al. |
| 6,738,264 B2 * | | 5/2004 | Takagi .......................... 361/814 |
| 6,839,576 B2 * | | 1/2005 | Aagaard et al. .......... 455/575.1 |
| 7,225,004 B2 * | | 5/2007 | Saito et al. ............... 455/575.7 |
| 7,249,860 B2 * | | 7/2007 | Kulas et al. .................. 359/872 |
| 7,336,782 B2 * | | 2/2008 | Watanabe et al. ...... 379/433.13 |
| 7,469,451 B2 * | | 12/2008 | Hashizume .................. 16/386 |

(Continued)

FOREIGN PATENT DOCUMENTS

EP    0 836 308 A    4/1998

(Continued)

OTHER PUBLICATIONS

European Search Report for European Application No. 05014486.4-2214, dated Dec. 16, 2005.

*Primary Examiner*—Jeremy C Norris
*Assistant Examiner*—Xiaoliang Chen
(74) *Attorney, Agent, or Firm*—Myers Bigel Sibley & Sajovec

(57)    ABSTRACT

A mechanical rotation and electrical interface device is provided in a portable electronic device. The interface device includes a hinge having a single signal connection in its interior between a first and a second part of the portable electronic device, a first processing unit connected to the hinge and to a number of parallel conductors in the first part, where the first processing unit receives a number of parallel electrical signals generated in the first part, combines these into a single signal and transmits this single signal over the single signal connection, and a second processing unit connected to the hinge and to a number of parallel conductors provided in the second part, where the second processing unit receives the combined signal, splits it into a number of parallel signals and provides these to the parallel conductors provided in the second part.

15 Claims, 5 Drawing Sheets

U.S. PATENT DOCUMENTS

| | | | |
|---|---|---|---|
| 2001/0001749 A1* | 5/2001 | Andrews et al. | 439/165 |
| 2004/0023520 A1* | 2/2004 | Schriefer | 439/11 |
| 2004/0074045 A1 | 4/2004 | Winstead et al. | |
| 2004/0127266 A1* | 7/2004 | Aagaard et al. | 455/575.1 |
| 2004/0224729 A1* | 11/2004 | Watanabe et al. | 455/575.3 |
| 2005/0162338 A1* | 7/2005 | Ikeda et al. | 345/2.1 |
| 2005/0283945 A1* | 12/2005 | Pan | 16/221 |
| 2006/0034326 A1* | 2/2006 | Anderson et al. | 370/466 |
| 2006/0143863 A1* | 7/2006 | Schoolcraft et al. | 16/347 |

FOREIGN PATENT DOCUMENTS

| | | |
|---|---|---|
| EP | 1 484 900 A | 12/2004 |
| GB | 2 406 987 A | 4/2005 |

\* cited by examiner

MECHANICAL ROTATION AND ELECTRICAL INTERFACE COMBINATION

RELATED APPLICATIONS

The present application claims priority to European Patent Application No. 05014486.4, filed Jul. 4, 2005 and U.S. Provisional Application No. 60/696,888 filed Jul. 6, 2005, the disclosures of which are incorporated herein by reference in their entireties.

TECHNICAL FIELD OF THE INVENTION

The present invention relates to the field of portable electronic devices and more particularly to the provision of signals between rotatable parts of a portable electronic device via the hinge interconnecting such parts.

DESCRIPTION OF RELATED ART

There is a trend within the field of portable electronic devices, and especially within the field of cellular phones to split the phones in two parts that may be turned or rotated in relation to each other. Typical solutions are clam-shell phones where two parts may be turned around a hinging section in order to make the two parts be folded or unfolded through turning around a hinge. Another type of phone is the jack-knife or swivel type of phone, where the two parts are displaced from each other sideways in order to close or open the phone. At the same time there is also a trend of providing different electronic components and units in the different parts, where often the display is provided in one part, while the main processing power is provided in the other part. This leads to the need of providing several different signals between the two parts.

There is then a need for providing good signal transmission possibilities, while at the same time allowing safe rotation of the two parts in relation to each other.

One way of providing contact via a hinge when a number of electrical conductors are needed is to provide a flex film in the interior of the hinge. However, such a film may be subject of bending that may destruct the conductors on the film and/or impede the rotation so that the rotational angles that can be used may be limited.

US 2005/0063697 shows how one single electrical signal can be provided via a hinge of a portable electronic device.

U.S. Pat. No. 6,189,056 describes an information processing terminal including a combined PCMCIA card and keyboard in a first part and display, processor and other elements in a second part. PCMCIA address and data signals are here multiplexed if the first part is connected to a computer and the multiplexed signals provided via a hinge to the second part. This provides a limited reduction of the number of signal conductors needed. However there are still several parallel signals provided. If no such computer connection exist no multiplexing is performed, but only key press signals are forwarded via the hinge.

There is therefore a need for providing a hinge that allows good rotational properties as well as allows the provision of several signals between the two parts.

SUMMARY OF THE INVENTION

The present invention is directed towards solving the problem of providing communication between different parts of a portable electronic device joined to each other by a hinge, that allows good rotational properties as well as allows the provision of several signals between the two parts.

One object of the present invention is thus to provide a mechanical rotation and electrical interface device for use in a rotatable two part portable electronic device where the two parts are joined to each other by a hinge, which device provides good rotational properties while at the same time allowing the provision of several signals between the two parts.

According to a first aspect of the present invention, this object is achieved by a mechanical rotation and electrical interface device for use in a rotatable two part portable electronic device and comprising:

a hinge providing a rotational axis and having a single signal connection provided between the two parts, a first processing unit connected to the hinge and to be connected to a number of parallel conductors provided in a first part of the portable electronic device, said first processing unit being arranged to receive a number of parallel signals generated in the first part, combine these parallel signals into one first single signal and transmit this first single signal over the single signal connection, and a second processing unit connected to the hinge and to be connected to a number of parallel conductors provided in a second part of the portable electronic device, said second processing unit being arranged to receive said first combined signal, split it into a number of parallel electrical signals and provide these to the parallel conductors provided in the second part.

A second aspect of the present invention is directed towards a mechanical rotation and electrical interface device including the features of the first aspect, wherein the first part of the portable electronic device is to be connected to the hinge in a first plane and the second part of the portable electronic device is to be connected to the hinge in a second plane that is parallel to said first plane, wherein the two parallel planes are provided essentially perpendicular to the rotational axis of the hinge.

A third aspect of the present invention is directed towards a mechanical rotation and electrical interface device including the features of the first aspect, wherein the hinge comprises a first hinging section to be connected to the first part of the portable electronic device and having a first mechanical fastener, and a second hinging section to be connected to the second part of the portable electronic device and having a corresponding second mechanical fastener for joining the first and second sections to each other.

A fourth aspect of the present invention is directed towards a mechanical rotation and electrical interface device including the features of the first aspect, wherein the single signal connection is provided along the rotational axis of the hinge.

A fifth aspect of the present invention is directed towards a mechanical rotation and electrical interface device including the features of the first aspect, wherein the single signal connection is provided through an optical medium.

A sixth aspect of the present invention is directed towards a mechanical rotation and electrical interface device including the features of the first aspect, wherein the single signal connection is provided through an electrical conductor.

A seventh aspect of the present invention is directed towards a mechanical rotation and electrical interface device including the features of the sixth aspect, further comprising an electrical reference potential conductor in the hinge also provided along the rotational axis.

An eighth aspect of the present invention is directed towards a mechanical rotation and electrical interface device including the features of the sixth aspect, wherein electrical connections are provided via an electrical coaxial connector.

A ninth aspect of the present invention is directed towards a mechanical rotation and electrical interface device including the features of the eighth aspect, wherein the single signal connection is provided in the centre of the coaxial connector aligned with the rotational axis.

A tenth aspect of the present invention is directed towards a mechanical rotation and electrical interface device including the features of the eighth aspect, further comprising a separate electrical feed voltage conductor in the coaxial connector.

An eleventh aspect of the present invention is directed towards a mechanical rotation and electrical interface device including the features of the first aspect, further comprising
- a modulating unit connected between the first processing unit and the single signal connection and arranged to modulate the combined signal onto a carrier and supply the modulated carrier on said single signal connection, and
- a demodulating unit connected between the single signal connection and the second processing unit and arranged to demodulate the combined signal from the carrier.

A twelfth aspect of the present invention is directed towards a mechanical rotation and electrical interface device including the features of the eleventh aspect, wherein the carrier is a feeding voltage provided from the first part to the second part.

A thirteenth aspect of the present invention is directed towards a mechanical rotation and electrical interface device including the features of the first aspect, wherein the second processing unit is further arranged to receive a number of parallel signals generated in the second part, combine these parallel signals into one single signal and transmit this second combined signal over the single connection, and the first processing unit is further arranged to receive said second combined signal, split it into a number of parallel signals and provide these to the parallel conductors provided in the first part.

Another object of the present invention is to provide a portable electronic device having two parts that can be rotated in relation to each other via a hinge, which device provides good rotational properties while allowing the provision of several signals between the two parts.

According to a fourteenth aspect of the present invention, this object is achieved by a portable electronic device comprising
- a first and a second part that can be rotated in relation to each other, and
- a mechanical rotation and electrical interface device comprising
    - a hinge providing a rotational axis and having a single signal connection provided between the two parts,
    - a first processing unit connected to the hinge and to a number of parallel conductors provided in the first part, said first processing unit being arranged to receive a number of parallel signals generated in the first part, combine these parallel signals into one single signal and transmit this first combined signal over the single signal connection, and
    - a second processing unit connected to the hinge and a number of parallel conductors provided in the second part, said second processing unit being arranged to receive said first combined signal, split it into a number of parallel data signals and provide these to the parallel signal conductors provided in the second part.

A fifteenth aspect of the present invention is directed towards a portable electronic device including the features of the fourteenth aspect, in which it is a portable communication device.

A sixteenth aspect of the present invention is directed towards a portable electronic device includes the features of the fifteenth aspect, in which it is a cellular phone.

Another object of the present invention is directed towards providing a method of transferring a plurality of signals from a first part of a portable electronic device to a second part via a hinge, which allows the provision of good rotational properties while allowing the provision of several signals between the two parts.

According to a seventeenth aspect of the present invention, this object is achieved by a method of transferring a plurality of signals from a first part of a portable electronic device to a second part of the device via a hinge, comprising the steps of:
- receiving a number of parallel signals from a number of parallel conductors provided in the first part,
- combining these parallel signals into one single signal,
- transmitting this first combined signal over a single signal connection provided between the two parts in the hinge,
- receiving said first combined signal from said single signal connection,
- splitting the combined signal into a number of parallel signals, and
- delivering these parallel signals to a number of parallel conductors provided in the second part.

An eighteenth aspect of the present invention is directed towards a method including the features of the seventeenth aspect, wherein said combined signal is an electrical signal and further comprising the step of receiving a reference potential from the first part, and the step of delivering also comprises delivering the reference potential to the second part via the hinge.

A nineteenth aspect of the present invention is directed towards a method including the features of the seventeenth aspect, further comprising the steps of modulating the single signal on a carrier, the modulated carrier being used in the steps of transmitting and receiving said single signal, and demodulating the received single signal.

A twentieth aspect of the present invention is directed towards a method including the features of the nineteenth aspect, wherein the carrier is a feeding voltage provided from the first part to the second part.

The invention has the following advantages. Because only one single signal connection is used the electrical interface is kept simple and safe signal contact between the two parts can be easily provided. The device according to the second aspect provides a hinge that allows rotation by any angle between two parts and that is simple to produce. When, according to the eighth aspect an electrical coaxial connector is used, the signals transferred are furthermore shielded, which is an additional advantage of the present invention. If, according to the twelfth aspect, the feeding voltage is used as a carrier, which might be needed for supply of power to the second part, the number of conductors used can be even further reduced.

It should be emphasized that the term "comprises/comprising" when used in this specification is taken to specify the presence of stated features, integers, steps or components, but does not preclude the presence or addition of one or more other features, integers, steps, components or groups thereof.

BRIEF DESCRIPTION OF THE DRAWINGS

The present invention will now be described in more detail in relation to the enclosed drawings, in which.

DETAILED DESCRIPTION OF EMBODIMENTS

A portable electronic device according to the present invention will now be described in relation to a cellular phone, which is a preferred variation of such a device. The phone is furthermore preferably a so-called swivel type phone, although other types are feasible like clam-shell phones. The portable electronic device may be a portable communication device of some other type, like a cordless phone, a communication module, a PDA or any other type of portable device communicating with radio waves. It can also be a gaming machine a notepad or any other type of portable electronic device.

Figure 1:
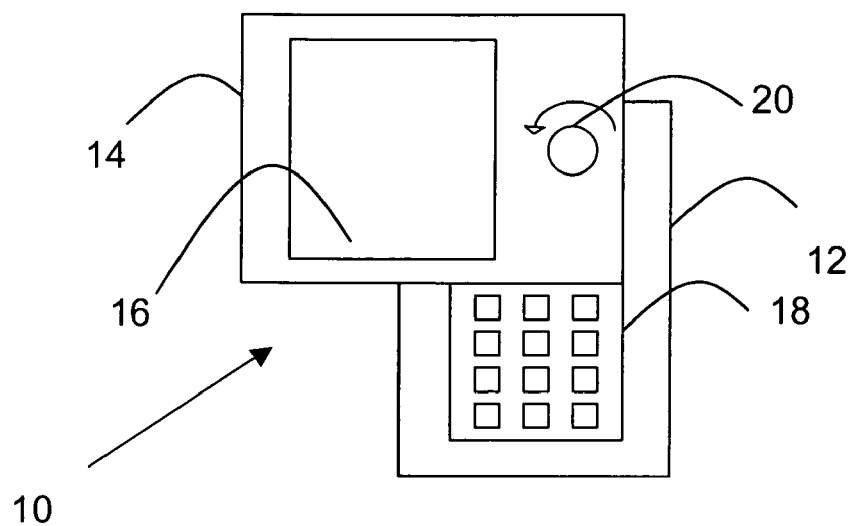
FIG. 1 schematically shows a top view of a two part portable electronic device where the two parts have been rotated in relation to each other, FIG. 2 schematically shows a side view of the two parts, where the hinge interconnecting them is indicated by dashed lines.

FIG. 1 schematically shows a front view of a swivel type phone according to the invention. The phone 10 includes a first and a second part 12 and 14. The first part 12 includes a keypad 18, while the second part 14 includes a display 16. It should be realised that the phone normally includes several more electronic and electrical elements, where the first part normally includes a battery, processing for handling telephony and other functions, like calendar, games, contacts, camera and music. This is however not shown here. The two parts 12 and 14 are joined by a hinge 20, which provides a swivel type of rotation of the two parts in relation to each other. In the figure, the second part 14 has been rotated by about 90 degrees in relation to the first part 12 around the hinge 20.

Figure 2:
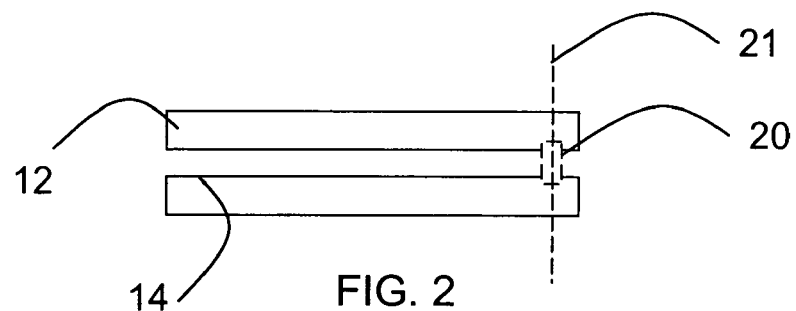

FIG. 2 shows a side view of the two parts 12 and 14 placed against each other with the same alignment in relation to a rotational axis 21 provided straight through the hinge 20, which is here indicated by a dashed box. Thus the two parts 12 and 14 are provided adjacent each other in two parallel planes that are perpendicular to the rotational axis 21. Each plane can furthermore be rotated around the same axis 21 defined by the hinge 20 but only within its own plane. However it should be realised that the invention is not limited to providing the two parts in parallel planes. Examples of other relationships will be given later on in this description.

Figure 3:
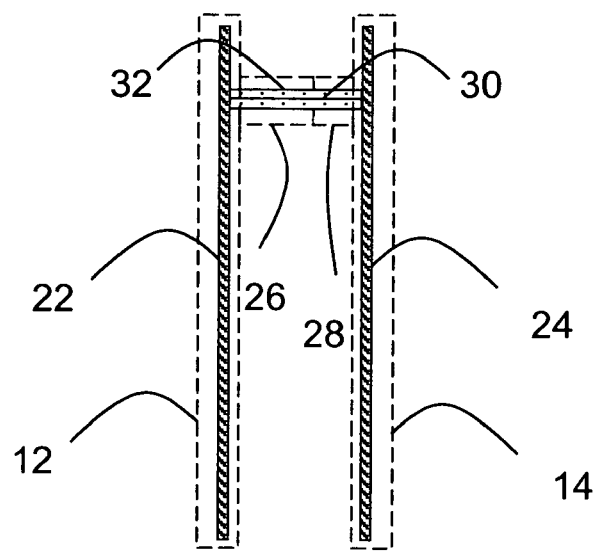
FIG. 3 shows a side view of two circuit boards provided in the two parts being interconnected via the hinge.

The two parts 12 and 14 each include a circuit board where different components and elements can be placed. FIG. 3 shows a side view of a first board 22 in the first part 12 joined to a second board 24 in the second part 14 via the hinge. The hinge here includes two sections. A first section 26 is mechanically fastened to the first part 12 and a second section 28 is mechanically fastened to the second part 14. The two parts 12 and 14 are here shown as dashed boxes as are the two sections 26 and 28 of the hinge. The two sections 26 and 28 are joined to each other, preferably through a snap joint. In the middle of the hinge, i.e. straight through the two sections 26 and 28 along the rotational axis of the hinge, there is provided a single signal connection 30, which according to some embodiments of the present invention is electrical. There is thus one single signal connection 30 between the two boards 22 and 24 provided in the interior of the hinge. Around this single signal connection there is provided a cylindrically shaped reference voltage conductor 32. The single signal connection 30 and the reference voltage conductor are connected to the two boards 22 and 24.

Figure 4:
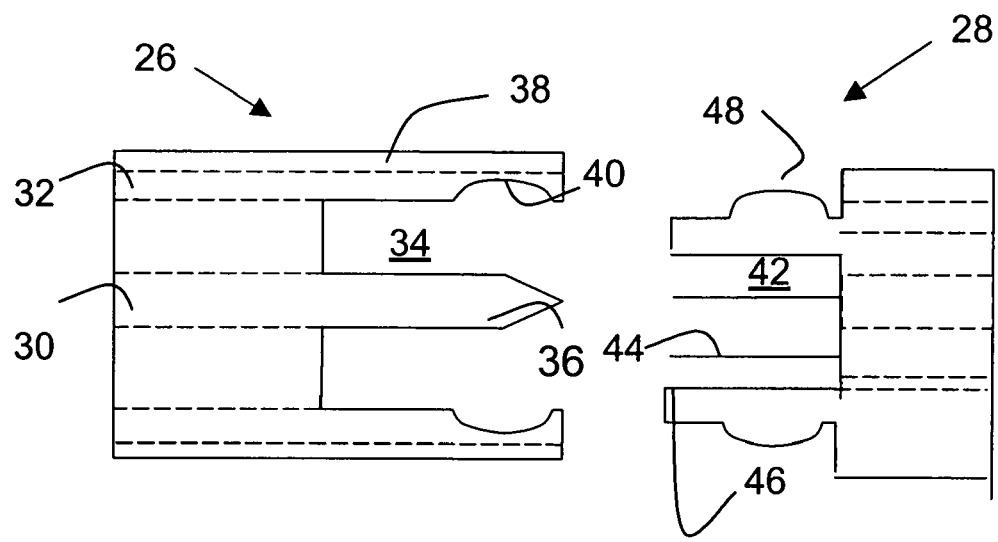
FIG. 4 shows a cross sectional view of one combined electrical connector and hinge used in the present invention.

FIG. 4 schematically shows a cross-sectional view through the two sections 26 and 28 of the hinge according to a first embodiment of the present invention. The hinge is according to some embodiments of the present invention preferably provided as a snap-in coaxial connector. Here the single signal connection is provided as an electrical core conductor 30, which is surrounded by a the cylindrical reference voltage conductor 32, here in the form of a foil used for ground. Between these conductors there is normally provided an insulating material. At the end of the first section 26 intended to face the second section 28, there is provided a recess 34, where a part of the foil 32 makes out the inner walls of this recess 34. In the centre of the recess 34 an end of the signal conductor protrudes in the form of a sharp ended rod 36. The inner wall of the recess is provided with an annular groove 40 arranged for fastening the first section 26 to the second section 28. The annular groove 40 here makes up a first mechanical fastener.

The second section 28 includes a cylindrical receiving unit provided with a recess 42 facing the recess 34 of the first section 26. The outer wall 46 of the receiving unit includes electrically conducting material and is provided with a cylindrical protrusion 48 adapted to snap into the annular groove 40 of the first section 26. The cylindrical protrusion 48 here makes up a second mechanical fastener. The outer wall 46 is dimensioned to press onto the inner wall of the first section 26. In the middle of the recess 42 there is provided a cylindrical receptacle 44 adapted to receive the rod 36 of the first section. Thus the inner diameter of the cylindrical receptacle 44 is adapted to the diameter of the rod 36 of the first section.

In this way a hinge element is provided that allows rotation of the two parts of a portable electronic device around an axis of rotation that is defined along the centre of the single signal connection 30. The parts can be rotated by any amount in relation to each other. At the same time safe electrical contact is always guaranteed. This is due to the coaxial layout of the conductor. It should be realised that the shown hinge is just exemplifying. It is for instance possible to provide the second section with a groove and the first section with a protrusion. It is furthermore possible to provide the first section with a receptacle and the second section with a rod. The mechanical fasteners can be provided separate from the reference potential conductor. In fact, it is possible to provide mechanical fastening by a suitable dimensioning of the rod. In this case the rod may be provided with a tip having an annular protrusion adapted to fit in an annular groove of a corresponding receptacle. What is important is that safe mechanical contact is provided allowing rotation of the two parts in relation to each other together with a safe electrical contact that does not twist the electrical conductors.

Figure 5:
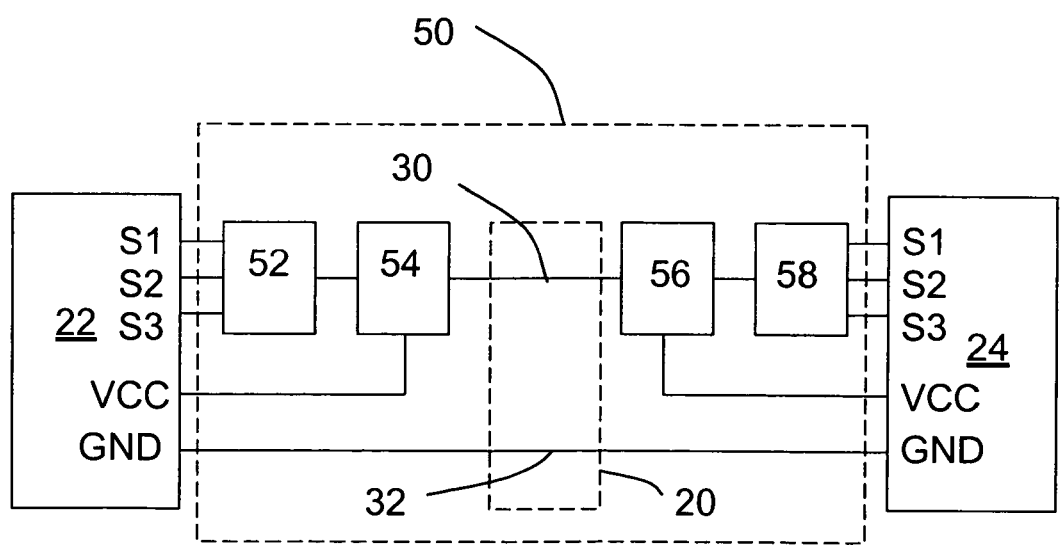
FIG. 5 shows a block schematic of the parts of the mechanical rotational and electrical interface device according to a first embodiment of the present invention.

FIG. 5 shows a block schematic of a mechanical rotation and electrical interface device 50 connected to the two boards 22 and 24 of the two parts. Here the first board 22 provides a number of parallel electrical conductors providing signals S1, S2, S3 that are to be connected to the second part. In the drawing three such conductors are shown. In reality though the number is quite frequently much higher than what is depicted in the figure. For this reason these conductors are connected to a first processing unit 52, which in turn is connected to a modulating unit 54. The first processing unit 52 and the modulating unit 54 are preferably provided at the first circuit board 22. The modulating unit 54 is connected to the singe signal connection 30 which runs in the middle of the coaxial hinge 20 (indicated by a dashed box). The first board 22 also provides a feeding voltage VCC, which is provided to the modulating unit 54. The first board 22 also provides a signal reference voltage in the form of ground GND, which is provided to the shield 32 of the coaxial hinge 20. On the other side of the hinge 20, i.e. at the second board 24, there is provided a demodulating unit 56 connected to the single signal connection 30. The demodulating unit 56 is furthermore connected to a second processing unit 58, which in turn is connected to a number of parallel signal conductors for providing signals S1, S2, S3 on the second board 24. The demodulating unit 56 is also connected to a feeding voltage connection on the second board 24 for supplying the feeding voltage VCC. Finally the reference potential GND is provided to a reference potential conductor on the second board 24 via the shield 32 of the coaxial hinge 20. The first and second processing units 52 and 58, the modulating and demodulating units 54 and 56 together with the hinge 20 including the single signal connection 30 and the reference potential conductor 32 together make up the mechanical rotation and electrical interface device 50 according to a first embodiment of the present invention.

Figure 6:
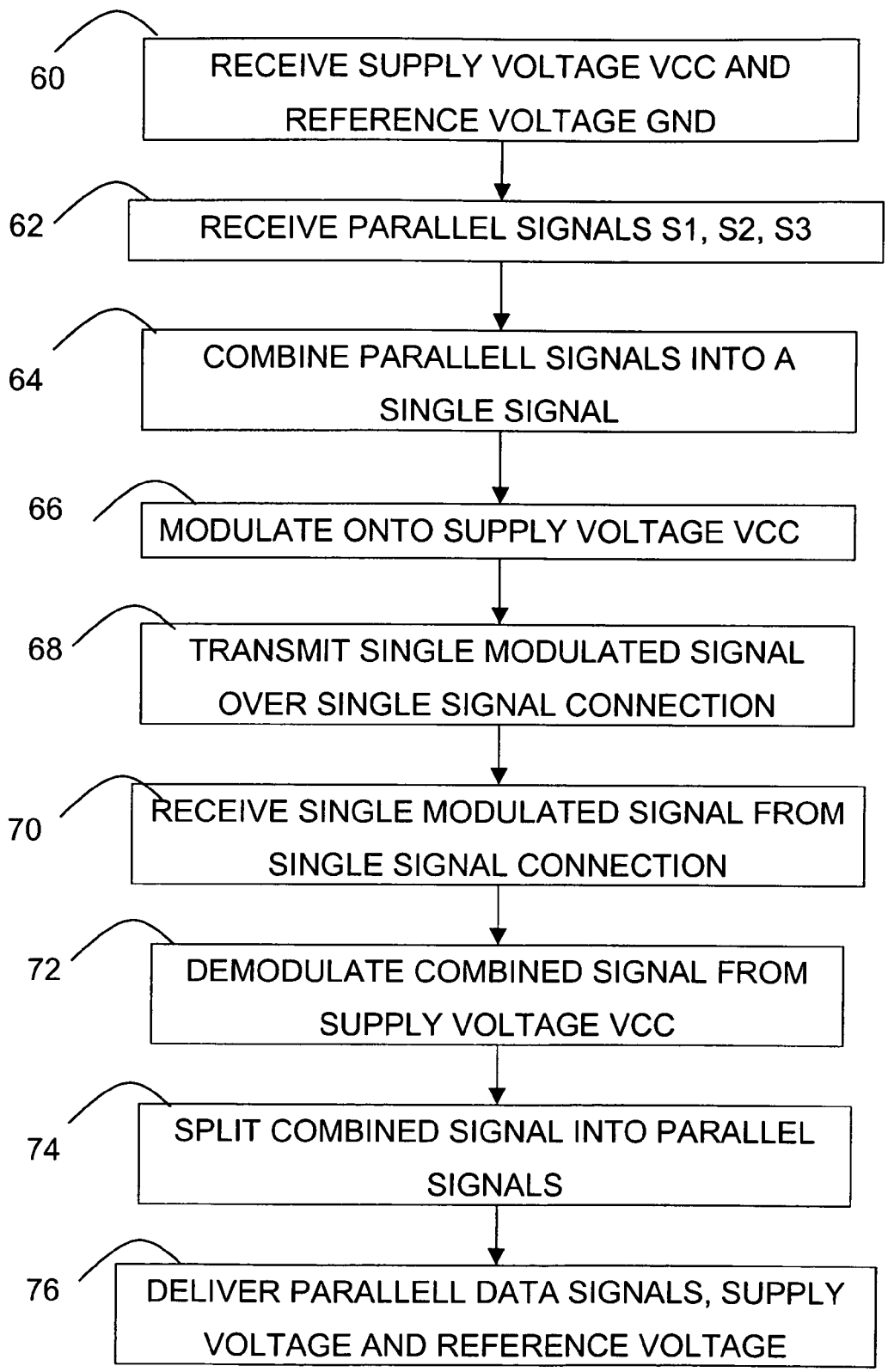
FIG. 6 shows a flow chart of a method of transferring a plurality of signals from the first to the second part as performed in the device shown in FIG. 5.

The functioning of the device of FIG. 5 will now be described in relation to FIG. 6, which shows a flow chart of a method of transmitting signals across the hinge according to the first embodiment of the present invention.

The first board 22 provides a reference voltage in the form of ground GND as well as a feeding voltage VCC. The first board also provides a number of parallel signals S1, S2, S3 on a number of parallel electrical signal conductors.

The method starts by the modulating unit 54 receiving the supply voltage VCC and the shield of the coaxial connector 20 receiving the reference voltage GND, step 60. The first processing unit 52 furthermore receives the parallel signals S1, S2, S3, step 62. These electrical signals are generated in the first part of the phone, for instance by suitable processing devices provided on the first board. The first processing unit 52 combines the received parallel signals S1, S2, S3 into a single electrical signal, step 64. It thus serializes the parallel signals. This can be done by sampling the parallel data for sending it in serial format. If needed a training sequence may be provided in order to be able to recover the clock signal used on the second board 24. The first processing unit 52 then provides this combined signal to the modulating unit 54. The modulating unit 54 modulates this single signal onto the supply voltage VCC, step 66, which can be made in line with any known type of DC power line modem protocol, like for instance some type of frequency modulation scheme using a certain frequency bandwidth. It is for instance possible to use Orthogonal Frequency Division Multiplexing (OFDM). The supply voltage thus acts as a carrier for the combined signal. The modulating unit 54 then transmits this modulated voltage signal onto the single signal conductor 30 in the middle of the hinge 20, step 68. The single modulated signal is received by the demodulating unit 56, step 70, which goes on and demodulates the combined signal from the voltage VCC and thus extracts the combined signal, step 72. At the same time it restores the original feeding voltage VCC. The demodulated combined signal is then provided to the second processing unit 58, which splits the combined signal into a number of parallel signals S1, S2, S3, step 74. These signals are thus the same signals that were received by the first processing unit 52 from the first board 22. The different signals are then provided to corresponding signal conductors on the second board 24, step 76. Thus the second processing unit 58 provides the parallel signals S1, S2, S3 to a number of parallel conductors on the second board 26, the demodulating unit 56 provides the feeding voltage VCC to a feeding voltage conductor on the second board 24 and the shielding 32 of the hinge 20 provides the reference potential GND to a reference voltage conductor on the second board 24.

In this way only two connections are used for supply of feeding voltage, reference potential as well as a number of parallel signals that are needed for operating electronic components and elements in the second part, for instance the display. In limiting the number of connections in this way it is possible to use a coaxial hinge as outlined in FIG. 4, which allows all degrees of rotation of the two parts in relation to each other. At the same time the coaxial connector is simple in its construction. By providing a single signal connection, the number of connections can be limited to a minimum.

Figure 7:
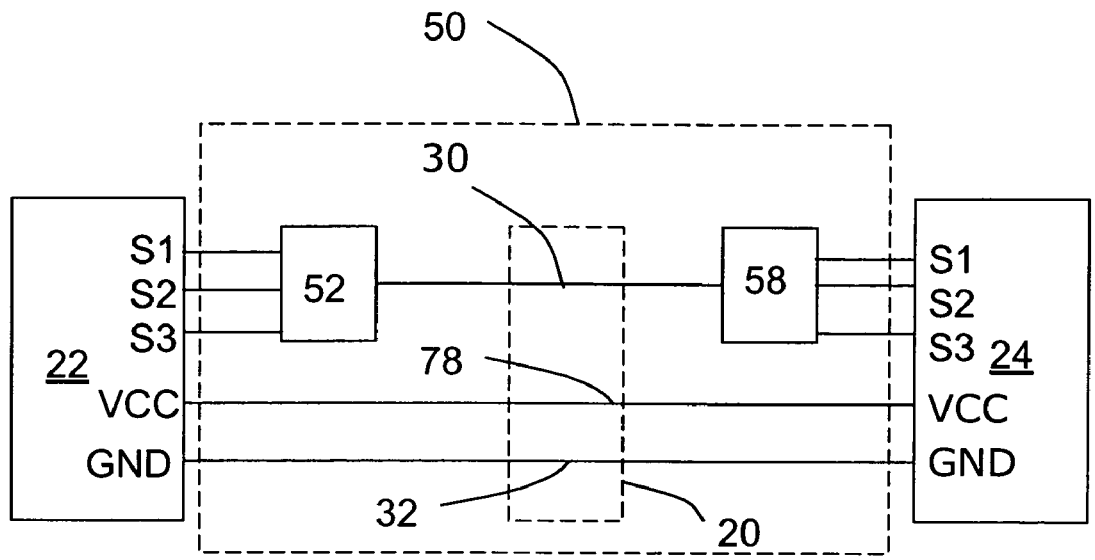
FIG. 7 shows a block schematic of the parts of the mechanical rotational and electrical interface device according to a second embodiment of the present invention.

The present invention can be varied in a number of ways, where a first variation is shown in FIG. 7, which shows a block schematic of a mechanical rotation and electrical interface device 50 according to a second embodiment of the present invention being connected to the two boards 22 and 24. The difference compared with FIG. 5 is that here there are not provided any modulating or demodulating units. Instead there is provided a further electrical conductor 78 in the coaxial connector. The additional conductor can be provided as an additional cylindrical conductor encircling the central conductor in FIG. 4. If for instance a coaxial connector having double shielding is used, the additional shielding can be used for this purpose. It should furthermore be noticed that any of the conductors in such a coaxial connector could be used for any of the signals. However it is often preferred to provide the reference voltage, if ground is used, in the outer shield layer. This second embodiment has the advantage of providing a simpler signal transmitting mechanism at the expense of a slightly more complex coaxial connector.

Figure 8:
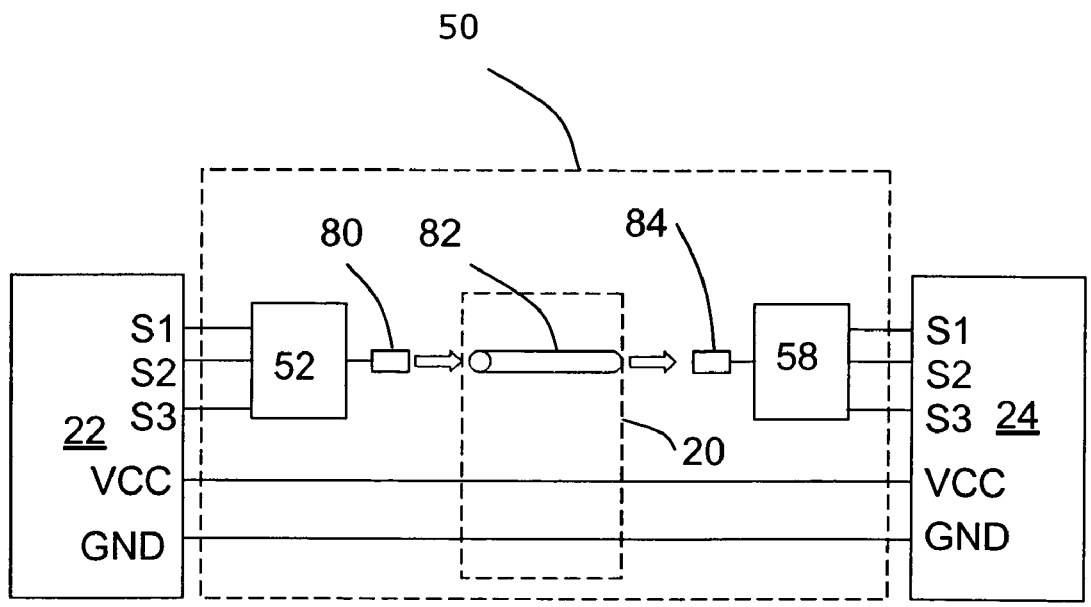
FIG. 8 shows a block schematic of the parts of the mechanical rotational and electrical interface device according to a third embodiment of the present invention, FIG. 9 schematically shows a clam-shell type of portable electronic device, and FIG. 10 schematically shows an alternative hinge solution.

FIG. 8 shows a block schematic of a mechanical rotation and electrical interface device according to a third embodiment of the present invention being connected to the two boards 22 and 24. Here the single signal connection is provided through the use of an optical medium 82. For this reason the modulating unit is provided as a light source 80, which modulates the single signal on a ray of light transmitted into the optical medium 82, which medium can be an optical fibre. The optical medium is here preferably provided in the centre of the hinge. The demodulating unit is here provided as an optical detector 84 arranged at the second board 24. In FIG. 8 there is shown separate supply voltage VCC and ground voltage GND via the hinge 20. However it should be realised that as an alternative the second part could provide these by itself via a separate battery provided therein. In that case there would only be one combined optical signal provided between the two parts. This embodiment has the advantage of providing a fast transmission mechanism where the serialization of the parallel signals does not provide any substantial delay.

Above was described the transmission of signals in one direction only, which is the case when the second part only includes entities that receive signals, like a normal display. However it might in some cases be interesting also to allow transmission of signals from the second part to the first part, for instance if some input devices were provided in the second part. Like if a keypad and/or a camera was provided in the second part. The keypad could in this case be part of a touch input display. In this case the first processing unit will have the possibility to also split signals, a possible modulating unit also be allowed to demodulate signals. The corresponding amendments would also have to be made to the second processing unit and a possible demodulating unit. This can be provided through dividing the bandwidth used in the modulation for different directions. One of the processing units may then be a master unit and the other a slave unit that negotiate the bandwidth used. The first data bits transferred would then furthermore need to be synchronisation bits.

Figure 9:
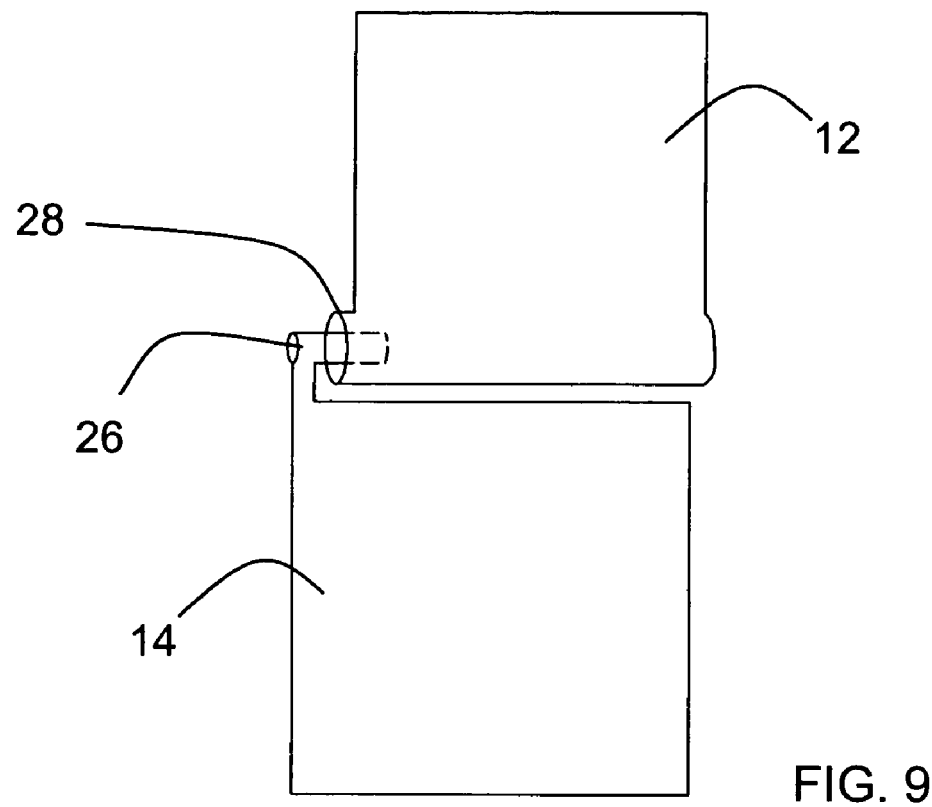
Figure 10:
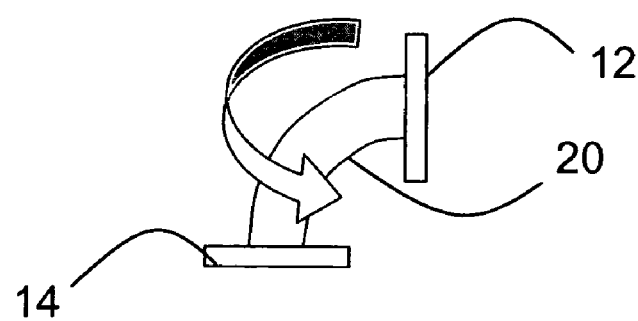

As mentioned earlier the present invention may be used in other types of handheld devices than swivel-type devices. One example is the use of a so-called clam-shell device as is shown in FIG. 9, which figure schematically shows a first part 12 joined to a second part 14 via a coaxial hinge comprising two sections 26 and 28. The two parts are thus not always parallel in the clam-shell device. There is another way in which the relationship between the two parts may be provided, which is by providing the coaxial hinge in a bent or curved form. This is exemplified in FIG. 10, which schematically shows a first part 12 joined to a second part 14 via a curved coaxial hinge 20.

The present invention has many advantages. It provides a hinge that allows rotation by any angle between two parts. It is simple to produce. Because only one single signal connection is used the electrical interface is kept simple and safe electrical contact can be easily provided. The signals transferred are furthermore shielded, which is an additional advantage of the present invention. By using the feeding voltage as a carrier the number of conductors used can be even further reduced when the single signal conductor is electrical and the first part is to also provide a feeding voltage to the second part.

The present invention can be varied in many ways in addition to those mentioned in relation to different embodiments of the invention. It is possible that feeding voltage and ground are not provided to the second part, but that this section provides its own ground and feeding voltage. If the combined signal transmitted between the two parts is electrical, it could then be provided as a differential signal, where one conductor provides the signal and the other conductor provides a reference voltage other than ground. Any conductor in the hinge may furthermore be used for any of the voltages, signal voltage, reference voltage or feeding voltage.

The invention claimed is:

1. A mechanical rotation and electrical interface device for use in a rotatable two part portable electronic device, the interface device comprising:
 a hinge providing a rotational axis and having a single signal connection provided between the two parts in its interior, the hinge comprising a first hinging section and a second hinging section,
 a first processing unit connected to the hinge and connected to a plurality of parallel conductors provided in a first part of the portable electronic device, said first processing unit being configured to receive a plurality of parallel electrical signals generated in the first part, combine these parallel signals into one first single signal and transmit this first single signal over the single signal connection,
 a second processing unit connected to the hinge and to be connected to a plurality of parallel conductors provided in a second part of the portable electronic device, said second processing unit being configured to receive said first combined signal, split it into a plurality of parallel electrical signals and provide these to the parallel conductors provided in the second part, and
 an electrical reference conductor that is arranged along the rotational axis,
 wherein the signal connection comprises a single signal connection that is arranged through the first hinging section and the second hinging section,
 wherein the second hinging section is aligned with the rotational axis of the hinge via an electrical conductor, and
 wherein the hinge comprises a snap-in coaxial connector, wherein the first hinging section comprises a rod, and wherein the second hinging section comprises a cylindrical receptacle that is configured to receive the rod.

2. A mechanical rotation and electrical interface device according to claim 1, wherein the first part of the portable electronic device is to be connected to the hinge in a first plane and the second part of the portable electronic device is to be connected to the hinge in a second plane that is parallel to said first plane, wherein the two parallel planes are provided substantially perpendicular to the rotational axis of the hinge.

3. A mechanical rotation and electrical interface device according to claim 1, wherein the hinge comprises
 a first hinging section to be connected to the first part of the portable electronic device and having a first mechanical fastener, and
 a second hinging section to be connected to the second part of the portable electronic device and having a corresponding second mechanical fastener for joining the first and second sections to each other.

4. A mechanical rotation and electrical interface device according to claim 1, wherein the single signal connection is provided along the rotational axis of the hinge.

5. A mechanical rotation and electrical interface according to claim 1, wherein electrical connections are provided via an electrical coaxial connector.

6. A mechanical rotation and electrical interface according to claim 5, wherein the single signal connection is provided in the centre of the coaxial connector aligned with the rotational axis.

7. A mechanical rotation and electrical interface according to claim 5, further comprising a separate electrical feed voltage conductor in the coaxial connector.

8. A mechanical rotation and electrical interface device according to claim 1, further comprising
 a modulating unit connected between the first processing unit and the single signal connection and configured to modulate the combined signal onto a carrier and supply the modulated carrier on said single signal connection, and
 a demodulating unit connected between the single signal connection and the second processing unit and configured to demodulate the combined signal from the carrier.

9. A mechanical rotation and electrical interface device according to claim 8, wherein the carrier is a feeding voltage provided from the first part to the second part.

10. A mechanical rotation and electrical interface device according to claim 1, wherein the second processing unit is further configured to receive a plurality of parallel signals generated in the second part, combine these parallel signals into one single signal and transmit this second combined signal over the single connection, and the first processing unit is further configured to receive said second combined signal, split it into a plurality of parallel signals and provide these to the parallel conductors provided in the first part.

11. A mechanical rotation and electrical interface according to claim 1, wherein the single signal connection comprises an electrical core conductor.

12. A mechanical rotation and electrical interface according to claim 1, wherein the electrical reference conductor comprises a cylindrical reference voltage conductor that surrounds the single signal connection.

13. A portable electronic device comprising:
 a first and a second part that can be rotated in relation to each other, and
 a mechanical rotation and electrical interface device comprising:
 a hinge providing a rotational axis and having a single signal connection provided between the two parts in its interior, the hinge comprising a first hinging section and a second hinging section,
 a first processing unit connected to the hinge and to a plurality of parallel conductors provided in the first part, said first processing unit being configured to receive a plurality of parallel electrical data signals generated in the first part, combine these parallel signals into one single signal and transmit this first combined signal over the single signal connection, and
 a second processing unit connected to the hinge and a plurality of parallel conductors provided in the second part, said second processing unit being configured to receive said first combined signal, split it into a plurality of parallel signals and provide these to the parallel signal conductors provided in the second part,
 wherein the single signal connection is arranged through the first hinging section and the second hinging section,
 wherein the second hinging section is aligned with the rotational axis of the hinge via an optical medium, and
 wherein the hinge comprises a snap-in coaxial connector, wherein the first hinging section comprises a rod, and wherein the second hinging section comprises a cylindrical receptacle that is configured to receive the rod.

14. A device according to claim 13, further comprising a portable communication device.

15. A device according to claim 13, further comprising a cellular phone.

* * * * *